United States Patent
Aron et al.

(10) Patent No.: US 10,552,483 B2
(45) Date of Patent: *Feb. 4, 2020

(54) MECHANISM FOR PERFORMING LOCKLESS ROLLING UPGRADE OF NOSQL DATABASE

(71) Applicant: NUTANIX, INC., San Jose, CA (US)

(72) Inventors: Mohit Aron, Saratoga, CA (US); Parthasarathy Ramachandran, Palo Alto, CA (US); Rishi Bhardwaj, San Jose, CA (US)

(73) Assignee: Nutanix, Inc, San Jose, CA (US)

(*) Notice: Subject to any disclaimer, the term of this patent is extended or adjusted under 35 U.S.C. 154(b) by 267 days.

This patent is subject to a terminal disclaimer.

(21) Appl. No.: 15/445,241

(22) Filed: Feb. 28, 2017

(65) Prior Publication Data

US 2017/0169130 A1 Jun. 15, 2017

Related U.S. Application Data

(62) Division of application No. 14/251,165, filed on Apr. 11, 2014, now Pat. No. 9,619,490.

(51) Int. Cl.
| | |
|---|---|
| G06F 16/00 | (2019.01) |
| G06F 16/84 | (2019.01) |
| G06F 16/21 | (2019.01) |
| G06F 16/22 | (2019.01) |
| G06F 16/27 | (2019.01) |
| G06F 16/23 | (2019.01) |
| G06F 9/455 | (2018.01) |

(52) U.S. Cl.
CPC .......... *G06F 16/86* (2019.01); *G06F 9/45558* (2013.01); *G06F 16/21* (2019.01); *G06F 16/219* (2019.01); *G06F 16/221* (2019.01); *G06F 16/2358* (2019.01); *G06F 16/273* (2019.01); *G06F 2009/4557* (2013.01)

(58) Field of Classification Search
CPC ...... G06F 16/23; G06F 16/2379; G06F 16/86; G06F 8/658; G06F 9/45558; G06F 9/45533
See application file for complete search history.

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |
| 2009/0265425 | A1 | 10/2009 | Lipscomb et al. |

(Continued)

FOREIGN PATENT DOCUMENTS

| | | | |
|---|---|---|---|
| EP | 1091305 B1 * | 10/2003 | .......... G06F 11/1433 |
| WO | WO 2011051265 A2 | 5/2011 | |

OTHER PUBLICATIONS

PCT International Search Report and Written Opinion for corresponding International Application No. PCT/US2015/025348, dated Jul. 27, 2015, 11 pages.

(Continued)

*Primary Examiner* — Augustine K. Obisesan
(74) *Attorney, Agent, or Firm* — Vista IP Law Group, LLP

(57) ABSTRACT

A method for performing lockless modifications during a rolling upgrade of a column family from an old column family version to a new column family version in a NoSQL database.

27 Claims, 7 Drawing Sheets

(56) References Cited

U.S. PATENT DOCUMENTS

| | | | |
|---|---|---|---|
| 2011/0307654 A1 | 12/2011 | Ma et al. | |
| 2012/0036165 A1* | 2/2012 | Driesen | G06F 16/217 707/803 |
| 2014/0358854 A1* | 12/2014 | Tabenkin | G06F 8/658 707/620 |
| 2015/0007159 A1 | 1/2015 | Gebhard et al. | |
| 2016/0203166 A1 | 7/2016 | Aron et al. | |

OTHER PUBLICATIONS

MapR Technologies, "The MapR Distribution for Apache Hadoop," 2011 (2011) <URL: https://www.mapr.com/sites/default/files/mapr_dist_white_paper.pdf>.

Oracle, "Database Rolling Upgrades Made Easy by Using a Data Guard Physical Standby Database." Oct. 2011 (Oct. 2011) <URL: http://www.oracle.com/au/products/database/maa-wp-11g-upgrades-made-easy-131972.pdf>.

Scavuzzo, "Interoperable data migration between NoSQL columnar databases." Dec. 18, 2013 (Dec. 18, 2013) <URL:https://www.politesi.polimi.it/bitstream/10589/88606/1/2013_12_Scavuzzo.PDF>.

Cattell, "Scalable SQL and NoSQL data stores," ACM SIGMOD Record. Dec. 2010 (Dec. 2010) <URL: http://www.sigmod/ord/publications/sigmod-record/1012/pdfs/04.surveys.cattell.pdf>.

Notice of Allowance and Fee(s) due dated Nov. 29, 2016 for related U.S. Appl. No. 14/251,165, 13 pages.

Lombardo, et al., "Issues in Handling Complex Data Structures with NoSQL databases" 14th International Symposium on Symbolic and Numeric Algorithms for Scientific Computing, pp. 443-448, 2012, 6 pages.

Zhao et al., "Cloud-Hosted Data Storage Systems", Cloud Data Management, Chapter 3, pp. 21-45, Feb. 17, 2014, 25 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

MECHANISM FOR PERFORMING LOCKLESS ROLLING UPGRADE OF NOSQL DATABASE

CROSS-REFERENCE TO RELATED APPLICATIONS

The present application is a divisional application of U.S. patent application Ser. No. 14/251,165, entitled "MECHANISM FOR PERFORMING LOCKLESS ROLLING UPGRADE OF NOSQL DATABASE", filed on Apr. 11, 2014, which is hereby incorporated by reference in its entirety.

FIELD

This disclosure concerns a mechanism for performing a rolling upgrade of a NoSQL database, and in particular to a mechanism for performing a lockless rolling upgrade of a NoSQL database.

BACKGROUND

A relational database is a database that has a collection of tables of data items, all of which are formally described and organized according to the relational model. In contrast, a NoSQL database is a database that provides a mechanism for storage and retrieval of data that is modeled in means other than the tabular relations used in relational databases. NoSQL databases allow for simplicity of design, horizontal scaling and finer control over availability. They are sometimes preferred over relational databases due to their use of optimized key-value stores that lend to simple retrieval and appending operations.

In some implementations of a NoSQL database, column families are used to represent that data. A column family resembles a table in relational database. Column families contain rows and columns. Each row is uniquely identified by a row key, and each row has multiple columns including a name, value and timestamp. Unlike a table in a relational database, different rows in the same column family do not have to share the same set of columns, and a column may be added to one or multiple rows at a time. Each key in such a NoSQL database corresponds to a value which is an object and each key has values as columns and columns are grouped together into sets known as column families.

Often times, there arises a need to update a NoSQL database. Such updates may involve converting an old column family to a new column family. During such updates, it is important to maintain consistency for all data access to the database.

Typically, in order to maintain consistency for data access, updates to a NoSQL database occur using a lock-based mechanism. A lock is used when multiple users need to access a database concurrently. Any single user can modify those database records to which they have applied a lock that gives them exclusive access to the record until the lock is released. Locking not only provides exclusivity to writes but also prevents reading of unfinished modifications. This prevents data from being corrupted or invalidated when multiple users try to read while others write to the database. However, utilizing a locking mechanism to update a NoSQL database leads to several inefficiencies, the most prominent of which is the amount of downtime required to update the database.

SUMMARY

Some embodiments of the present invention are directed to a method for performing lockless lookups during a rolling upgrade of a column family from an old column family version to a new column family version in a NoSQL database, including receiving a request to perform a lookup of the column family in the NoSQL database, returning data read from the new column family version if it is determined to be available in the new column family version, returning data read from the old column family version if it is determined to be unavailable in the new column family version, attempting to update the new column family version with data read from the old column family version when data read from the old column family version is returned, updating the new column family version with data read from the old column family version when the request is a first lookup request on the column family during the rolling upgrade and returning a lookup timeout when the request is subsequent or concurrent with the first lookup request on the column family during the rolling upgrade.

Further details of aspects, objects, and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention and should not be taken as limiting the scope of the invention.

DETAILED DESCRIPTION OF THE EMBODIMENTS OF THE INVENTION

A relational database is a database that has a collection of tables of data items, all of which are formally described and organized according to the relational model. In contrast, a NoSQL database is a database that provides a mechanism for storage and retrieval of data that is modeled in means other than the tabular relations used in relational databases. NoSQL databases allow for simplicity of design, horizontal scaling and finer control over availability. They are sometimes preferred over relational databases due to their use of optimized key-value stores that lend to simple retrieval and appending operations.

In some implementations of a NoSQL database, column families are used to represent that data. A column family resembles a table in relational database. Column families contain rows and columns. Each row is uniquely identified by a row key, and each row has multiple columns including a name, value and timestamp. Unlike a table in a relational database, different rows in the same column family do not have to share the same set of columns, and a column may be added to one or multiple rows at a time. Each key in such a NoSQL database corresponds to a value which is an object and each key has values as columns and columns are grouped together into sets know as column families.

Often times, there arises a need to upgrade a NoSQL database. Such upgrades may involve converting an old version of a column family to a new version. During such an upgrade, it is important to maintain consistency for all data access to column families of the NoSQL database.

Typically, in order to maintain consistency for data access, upgrades to a NoSQL database occur using a lock-based mechanism. A lock is used when multiple users need to access a database concurrently. Any single user can modify those database records to which they have applied a lock that gives them exclusive access to the record until the lock is released. Locking not only provides exclusivity to writes but also prevents reading of unfinished modifications. This prevents data from being corrupted or invalidated when multiple users try to read while others write to the database. However, utilizing a locking mechanism to update a NoSQL database leads to several inefficiencies, the most prominent of which is the amount of downtime required to update the database.

Figure 1:
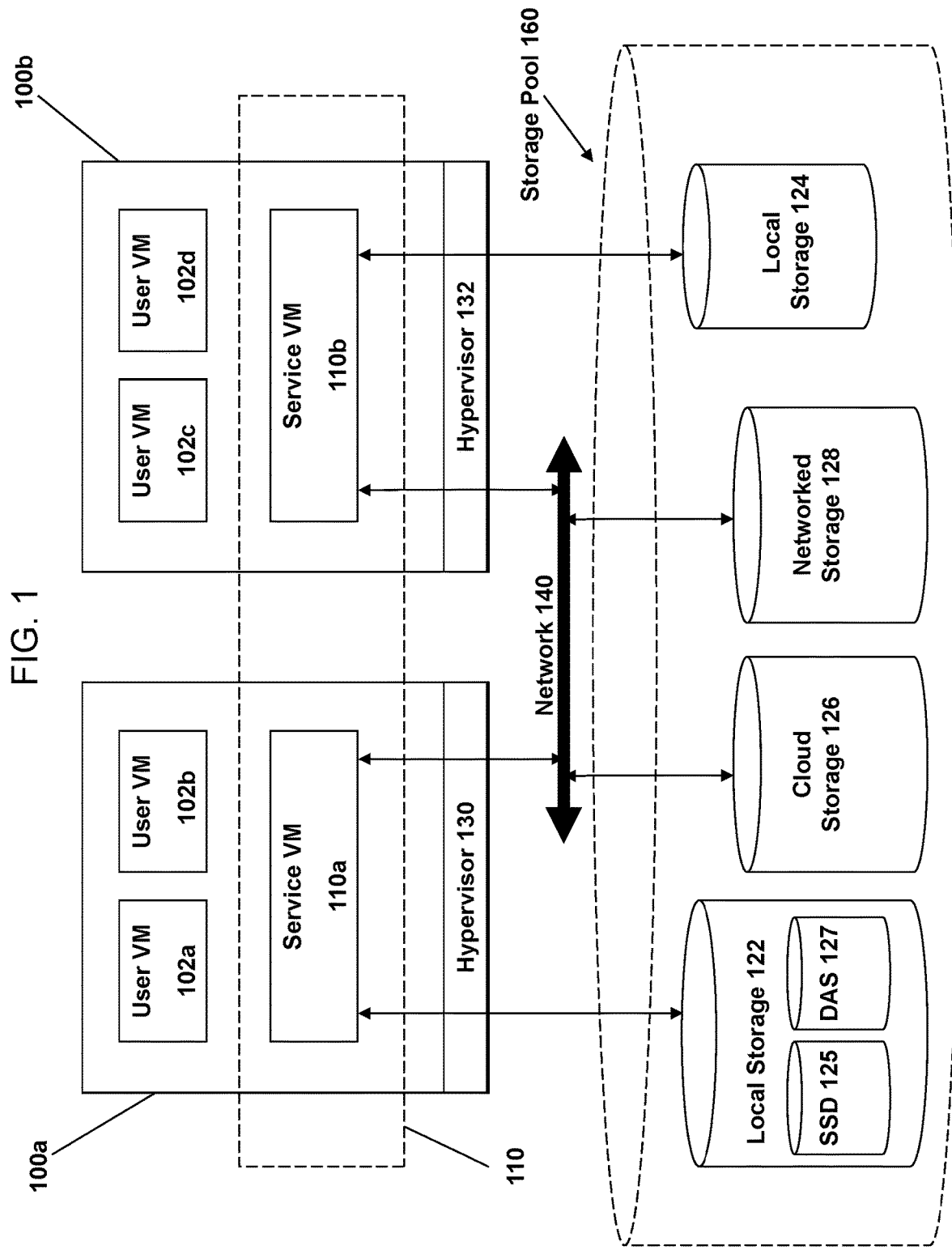
FIG. 1 illustrates an example architecture to implement I/O and storage device management in a virtualization environment according to some embodiments of the invention.

FIG. 1 illustrates an example architecture to implement I/O and storage device management in a virtualization environment according to some embodiments of the invention. The architecture of FIG. 1 can be implemented for a distributed platform that contains multiple servers 100*a* and 100*b* that manages multiple-tiers of storage. Like the prior art, the multiple tiers of storage includes storage that is accessible through a network 140, such as cloud storage 126 or networked storage 128 (e.g., a SAN or "storage area network"). Unlike the prior art, the present embodiment also permits management of local storage 122/124 that is within or directly attached to the server and/or appliance. Examples of such storage include SSDs 125 ("Solid State Drives") or HDDs ("hard disk drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100*a* or 100*b* runs virtualization software, such as the ESX product available from VMWare. The virtualization software includes a hypervisor 130/132 to manage the interactions between the underlying hardware and the one or more user VMs 102*a*, 102*b*, 102*c*, and 102*d* that run client software.

A special VM 110*a*/110*b* is used to manage storage and I/O activities according to some embodiment of the invention, which is referred to herein as a "Service VM". The term "Service VM" may also be referred to as the "Controller VM", and these terms may be used interchangeably throughout the remainder of the description. The Controller VMs 110*a*/110*b* are not formed as part of specific implementations of hypervisors 130/132. Instead, the Controller VMs run as virtual machines in the hypervisors 130/132 on the various servers 102*a* and 102*b*, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110*a-b* exports one or more block devices or NFS server targets that appear as disks to the client VMs 102*a-d*. These disks are virtual, since they are implemented by the software running inside the Controller VMs 110*a-b*. Thus, to the user VMs 102*a-d*, the Controller VMs 110*a-b* appear to be exporting a clustered storage appliance that contains some disks. All user data (including the operating system) in the client VMs 102*a-d* resides on these virtual disks.

Significant performance advantages can be gained by allowing the virtualization system to access and utilize local (server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Yet another advantage of the present embodiment of the invention is that storage-related optimizations for access and storage of data can be implemented directly within the primary storage path. For example, in some embodiments of the invention, the Controller VM 110*a* can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QoS) functions, encryption, and compression. The new architecture massively parallelizes storage, by placing a storage controller—in the form of a Controller VM—at each hypervisor, and thus makes it possible to render enough CPU and memory resources to achieve the aforementioned optimizations.

The architecture described in FIG. 1 utilizes a NoSQL database for maintaining metadata to be utilized by the controller VMs in providing storage management to the user VMs. The metadata is stored in a NoSQL database that is shared amongst the controller VMs. The NoSQL database utilizes column families to organize the metadata, and upgrades to the NoSQL database involve converting an old column family version to a new column family version.

Figure 2:
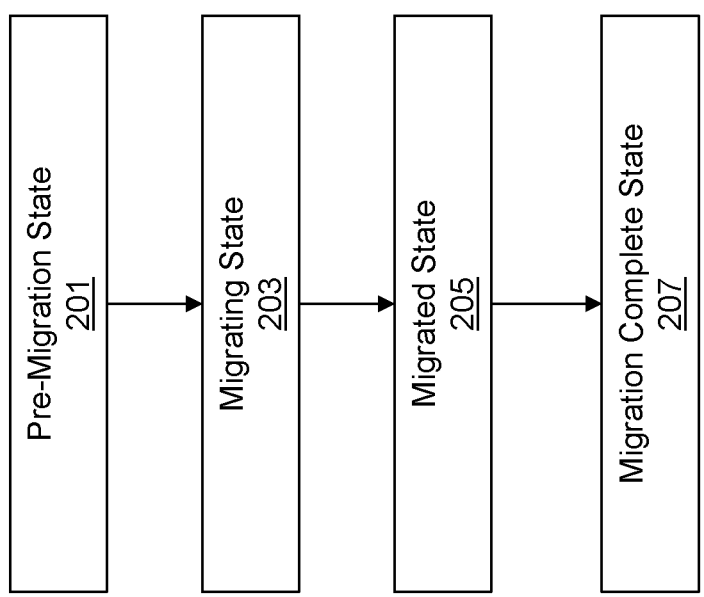
FIG. 2 is a state diagram illustrating the state transitions utilized for updating column families in a NoSQL database according to some embodiments of the invention.

FIG. 2 is a state diagram illustrating the state transitions utilized for upgrading column families in a NoSQL database according to some embodiments of the invention. As mentioned above, upgrades to the NoSQL database involve converting an old column family version to a new column family version. Such a conversion involves 4 different states and 3 state transitions.

Before an update to a column family begins, the column family is in a pre-migrating state as shown at 201. When a column family is in a pre-migrating state, all data accesses directed to that column family of the NoSQL database are directed to the version of the column family that exists prior to updating. This version of the column family is known as the old column family version, and will be referred to herein as the old column family version. Thus, in the pre-migrating state, all requests to read or write to a column family are directed at the old column family version.

As the update occurs, data from the old column family version is migrated to a new version of the column family. This new version of the column family is known as the new column family version, and will be referred to herein as the new column family version. Data from the old column family version is migrated to the new column family version upon a lookup request for the column family being issued by a controller VM. As data from the old column family version is being migrated to the new column family version, the column family is in a migrating state as shown at 203. Thus, a state transition occurs when a column family transitions from a pre-migrating state to a migrating state.

During the migrating state, data accesses to a column family must remain consistent. In order to ensure consistency, a mechanism for performing lockless lookups during a rolling upgrade of a column family in a NoSQL database as well as a mechanism for performing lockless modifications during a rolling upgrade of a column family in a NoSQL database will be utilized. Further details about the mechanism for performing lockless lookups during a rolling upgrade of a column family in a NoSQL database as well as a mechanism for performing lockless modifications during a rolling upgrade of a column family in a NoSQL database will be described below.

After migration of a column family in the NoSQL database has completed, the column family transitions from the migrating state to the migrated state as shown at 205. A column family in the migrated state has already migrated its data from the old column family version to the new column family version. However, at this junction, some of the controller VMs utilizing the NoSQL database may not yet be notified that the column family has completed migration. The column family remains in the migrated state until all of the controller VMs utilizing the NoSQL database have been notified that the column family has completed migration in order to prevent a possible race between controller VMs in reading data from the column family.

Once all of the controller VMs utilizing the NoSQL database have been notified that the column family has completed migration, the column family transitions from the migrated state to the migration complete state as shown at 207. At this point all data access to the column family are directed to the new column family version.

As mentioned above, during an upgrade of the NoSQL database, migration of a column family from an old column family version to a new column family version may occur. Such migration may be initiated by a lookup request directed at the column family. Several concurrent lookup requests may be directed at a column family at any given time while the column family is in a migrating state and as such it is important to ensure consistency of such lookup requests.

A mechanism for performing lockless lookups may be provided to ensure consistency of data access while the column family is in a migrating state. Utilizing a lockless lookup mechanism during a rolling upgrade of a column family allows for concurrent lookup requests to be handled without having to provide exclusivity to any controller VM for a set period of time. Instead, a compare and swap approach is used, where a lookup request is not fulfilled whenever it is determined that another lookup request is concurrently being fulfilled.

Figure 3:
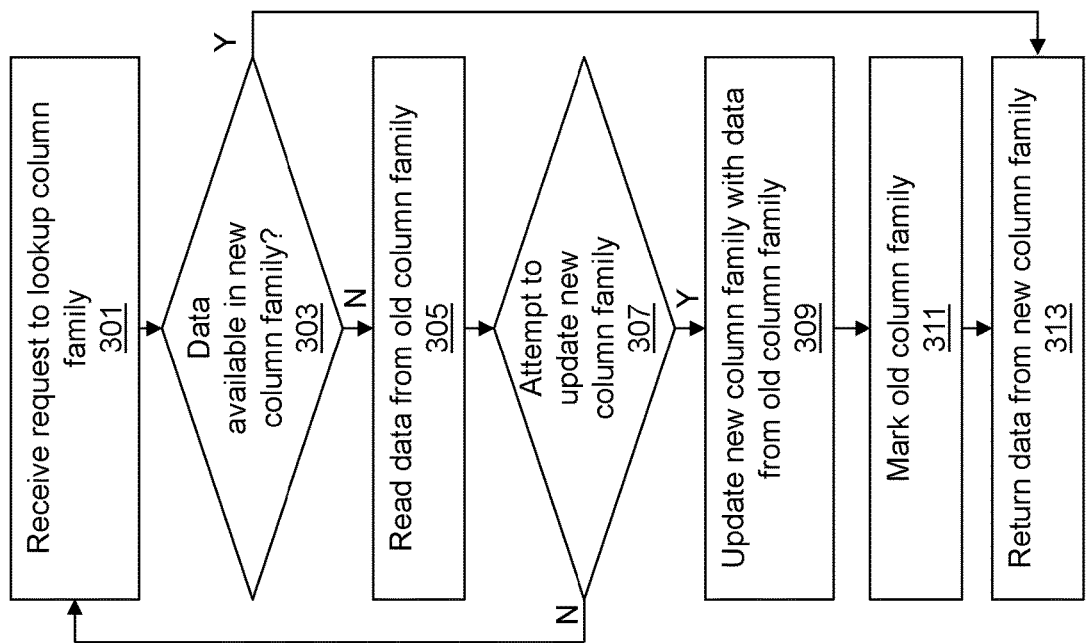
FIG. 3 is a flow diagram illustrating a mechanism for performing lockless lookups during a rolling upgrade of a column family in a NoSQL database according to some embodiments of the invention.

FIG. 3 is a flow diagram illustrating a mechanism for performing lockless lookups during a rolling upgrade of a column family in a NoSQL database according to some embodiments of the invention. The mechanism illustrated in FIG. 3 may be utilized to handle lookup requests directed at the column family while the column family is in a migrating state. The column family may be placed into a migrating state when an upgrade to the NoSQL database has begun. Even though the column family is in a migrating state, the data in the old column family version may not yet have migrated over to the new column family version. In other words, the new column family version may be empty even though the column family is in a migrating state. In some embodiments, data from the old column family version is not migrated to the new column family version until a lookup of the column family is requested.

Initially, a request to perform a lookup of a column family is issued by a controller VM. The request is received at the NoSQL database as shown at 301.

The lookup request may be the first lookup request issued while the column family is in a migrating state. When the lookup request is the first lookup request issued while the column family is in a migrating state, data from the old column family version has not yet migrated to the new column family version.

Alternatively, the lookup request may be a lookup request issued subsequent to or substantially concurrent with the first lookup request. Even when the lookup request is issued substantially concurrent with the first lookup request, it is treated as if it is received after the first lookup request and will be handled as if it was a lookup request issued subsequent to the first lookup request.

When the request to perform the lookup of the column family is received, a determination is made as to whether or not data is available in the new column family version as shown at 303.

If it is determined that data is available in the new column family version, then the data from the new column family version is returned to the requesting controller VM as shown at 313. A determination that the data is available in the new column family version indicates that data from the old column family version has already migrated to the new column version family and that the lookup request currently being serviced is issued subsequent to completion of the first lookup request.

If it is instead determined that data is unavailable in the new column family version, then data from the old column family version is first read as shown at 305 and an attempt to update the new column family version with data read from the old column family version is made as shown at 307.

A determination that data is unavailable in the new column family version indicates that the lookup request is either the first lookup request on the column family while it is in a migrating state or is a lookup request that is issued substantially concurrent with the first lookup request. In the situation where the lookup request is the first lookup request, data has not yet migrated from the old column family version to the new column family version because no earlier lookup request has been issued to initiate the migration. In the situation where the lookup request is a lookup request that is issued substantially concurrent with the first lookup request, data has not yet migrated from the old column family version to the new column family version because fulfillment of the first lookup request has not yet been completed.

If the attempt to update the new column family version with data from the old column family version succeeds, then the new column family version is updated with data from the old column family version as shown at 309. This indicates that the lookup request was the first lookup request issued on the column family.

If the attempt to update the new column family version with data from the old column family version fails, then a lookup timeout is issued to the requesting controller VM as shown at 301, and the NoSQL database waits to receive another lookup request from the controller VM at 301. This occurs when the lookup request is issued substantially concurrent with the first lookup request. Because the first lookup request is being fulfilled by updating the new column family version with data from the old column family version, a concurrent lookup request cannot be simultaneously fulfilled by also updating the new column family version with data from the old column family version. The lookup timeout is delivered to the controller VM issuing the substantially concurrent lookup request to notify the controller VM that the concurrent lookup request cannot be fulfilled at the moment. Although the substantially concurrent lookup request cannot be immediately fulfilled, the corresponding controller VM is given the opportunity to later issue a subsequent lookup request after data has migrated from the old column family to the new column family.

Handling concurrent lookup requests in the above-described manner (e.g., using compare and swap), avoids the need for implementing a locking mechanism and thereby significantly reduces the downtime associated with lock-based upgrades.

After the new column family version has been updated with data from the old column family version, the old column family version is marked as shown at 311. This will allow for subsequent modification requests to the column family to be handled consistently without having to implement a lock-based approach, as will be described in greater detail below. Data from the new column family version may then be returned to the requesting controller VM as shown at 309.

Figure 4:
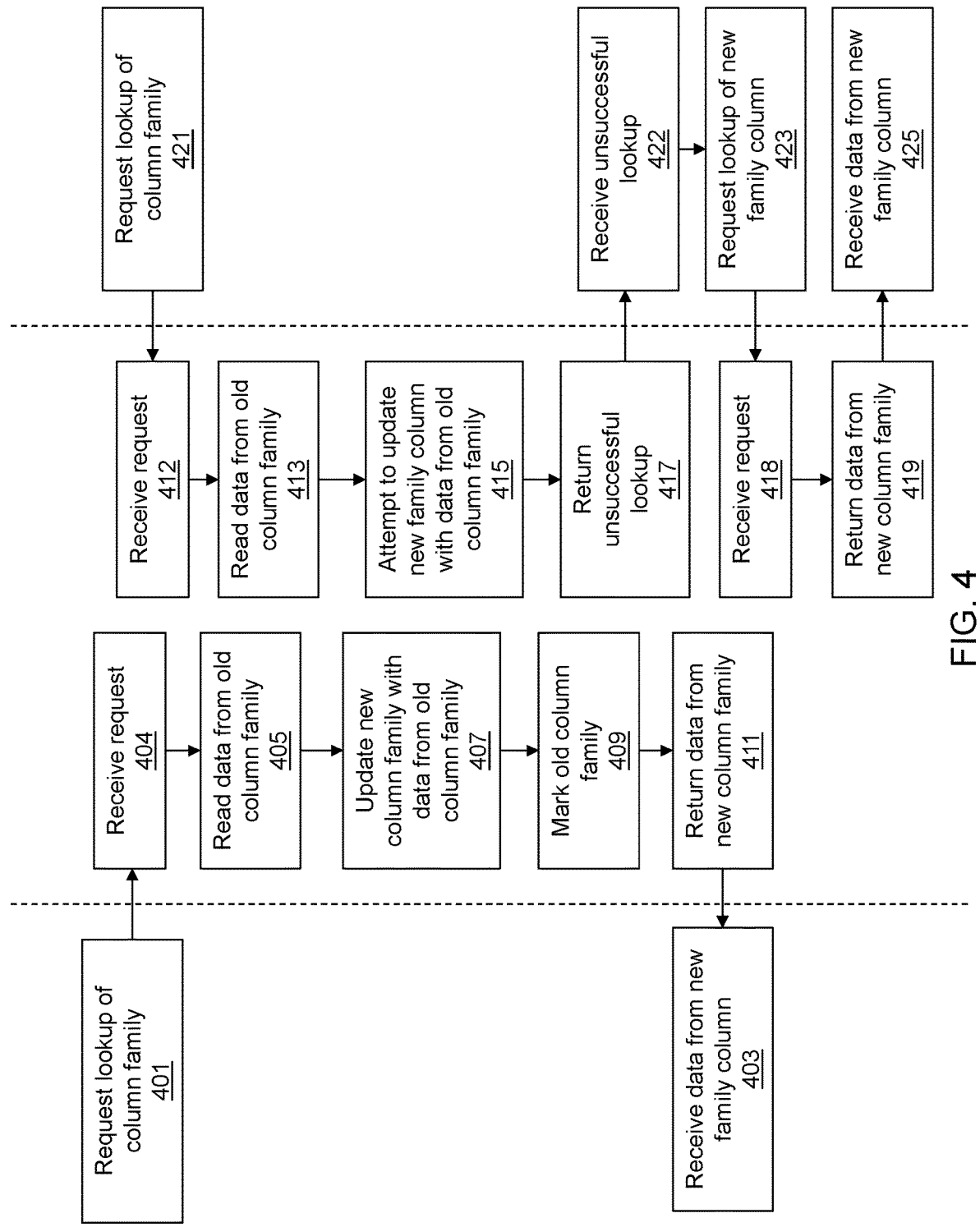
FIG. 4 illustrates an example of the mechanism for performing lockless lookups during a rolling upgrade of a column family in a NoSQL database according to some embodiments of the invention.

FIG. 4 illustrates an example of the mechanism for performing lockless lookups during a rolling upgrade of a column family in a NoSQL database according to some embodiments of the invention. FIG. 4 will be used to illustrate the example where two controller VMs issue lookup requests directed at a column family in a migrating state concurrently. The controller VM issued lookups are directed at the column family prior to the old column family version migrating its data to the new column family version.

In FIG. 4, steps performed by the first controller VM are depicted in the column to the left of the dashed line on the left hand side, steps performed at the NoSQL database are depicted in the column between the two dashed lines and steps performed by the second controller VM are depicted in the column to the right of the dashed line on the right hand side. For purposes of example, it will be assumed that the lookup request issued by the first controller VM will reach the NoSQL database ahead of the lookup request issued by the second controller VM, even though the first and second controller VMs issue their lookup requests concurrently. Time is depicted as moving in the downward direction.

The first controller VM issues a lookup request directed at the NoSQL database as shown at 401 and the NoSQL database receives the lookup request as shown at 404. Here, the lookup request issued by the first controller VM is the first lookup request issued while the column family is in a migrating state. Because the lookup request is the first lookup request issued while the column family is in a migrating state, data from the old column family version has not yet migrated to the new column family version.

When the request to perform the lookup of the column family issued by the first controller VM is received, a determination is made as to whether or not data is available in the new column family version. Here, it is determined that data is unavailable in the new column family version. This is because the lookup request issued by the first controller VM is the first lookup request, and data has not yet migrated from the old column family version to the new column family version because no earlier lookup request has been issued to initiate the migration.

Because it is determined that data is unavailable in the new column family version, data from the old column family version is first read as shown at 405 and an attempt to update the new column family version with data read from the old column family version is made. The attempt to update the new column family version with data from the old column family version succeeds, and the new column family version is updated with data from the old column family version as shown at 407. This indicates that the lookup request issued by the first controller VM is the first lookup request issued on the column family.

After the new column family version has been updated with data from the old column family version, the old column family version is marked as shown at 409. Data from the new column family version may then be returned to the first controller VM as shown at 411 where it is received as shown at 403.

The second controller VM concurrently issues a lookup request directed at the NoSQL database as shown at 421 and the NoSQL database receives the lookup request as shown at 412. Here, the lookup request issued by the second controller VM is substantially concurrent with the first lookup request issued by the first controller VM.

When the request to perform the lookup of the column family issued by the second controller VM is received, a determination is made as to whether or not data is available in the new column family version. Because the lookup request issued by the second controller VM is substantially concurrent with the first lookup request issued, data has not yet migrated from the old column family version to the new column family version because fulfillment of the first lookup request has not yet been completed. As such, it is determined that data is not yet available in the new column family version.

Because it is determined that data is unavailable in the new column family version, data from the old column family version is first read as shown at 413 and an attempt to update the new column family version with data read from the old column family version is made.

The attempt to update the new column family version with data from the old column family version 415 fails, and a lookup timeout is issued to the requesting controller VM as shown at 417 and it is received at the second controller VM as shown at 422. This occurs because the lookup request issued by the second controller VM is substantially concurrent with the first lookup request issued by the first controller VM. Because the first lookup request is being fulfilled by updating the new column family version with data from the old column family version, a concurrent lookup request cannot be simultaneously fulfilled by also updating the new column family version with data from the old column family version. The lookup timeout is delivered to the second controller VM issuing the substantially concurrent lookup request to notify the second controller VM that the concurrent lookup request cannot be fulfilled at the moment.

After the second controller VM has received a lookup timeout, it may subsequently issue another lookup request of the column family as shown at 423. The subsequent lookup request is received by the NoSQL database as shown at 418. At this point in time, data from the old column family version has already migrated to the new column family version (due to the lookup request initiated by the first controller VM) and so the NoSQL database is able to return data from the new column family version to fulfill the lookup request as shown at 419. The data from the new column family version is then received by the second controller VM as shown at 425.

Thus, FIG. 4 illustrates an example of handling concurrent lookup requests directed at a NoSQL database in a migrating state that avoids the need for implementing a locking mechanism and thereby significantly reduces the downtime associated with upgrading the NoSQL database.

Figure 5:
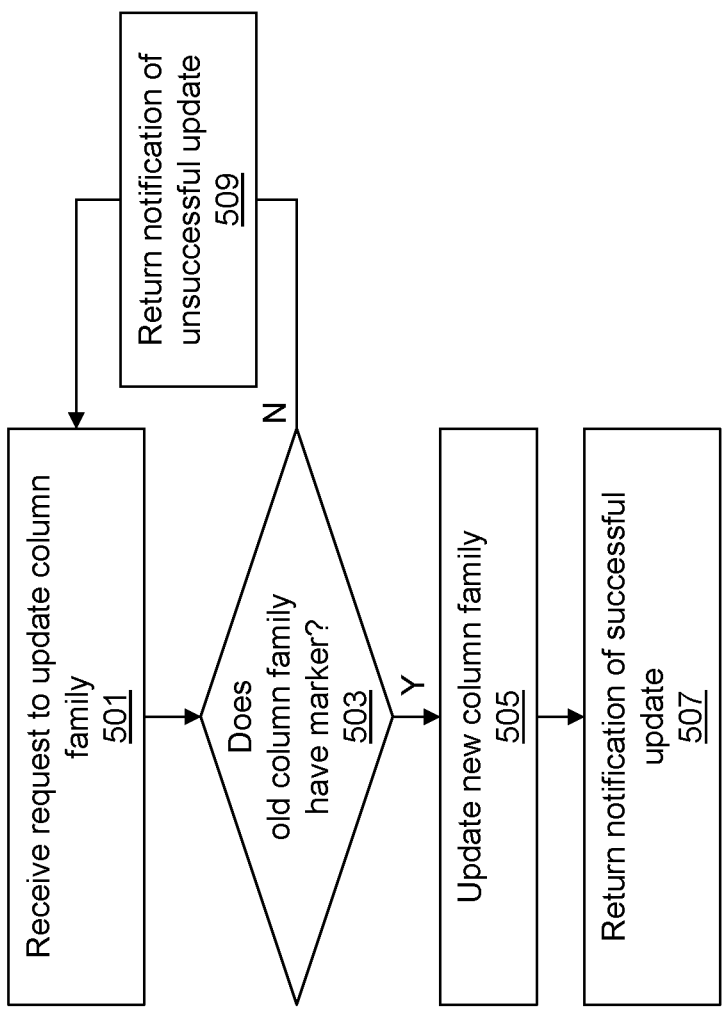
FIG. 5 is a flow diagram illustrating a mechanism for performing lockless modifications during a rolling upgrade of a column family in a NoSQL database according to some embodiments of the invention.

FIG. 5 is a flow diagram illustrating a mechanism for performing lockless modifications during a rolling upgrade of a column family in a NoSQL database according to some embodiments of the invention. The mechanism illustrated in FIG. 5 may be utilized to handle modification requests directed at the column family while the column family is in a migrating state. The column family may be placed into a migrating state when an upgrade to the NoSQL database has begun. Even though the column family is in a migrating state, the data in the old column family version may not yet have migrated over to the new column family version. In other words, the new column family version may be empty even though the column family is in a migrating state. In some embodiments, data from the old column family version is not migrated to the new column family version until a lookup of the column family is requested.

Initially, a request to perform an update of a column family is issued by a controller VM. The request is received at the NoSQL database as shown at 501.

The modification request may be issued while the column family is in a migrating state. When the modification request is issued while the column family is in a migrating state, data from the old column family version may not have migrated to the new column family version, and as such it is important to maintain consistency for the column family during modification.

When the request to perform the modification to the column family is received, a determination is made as to whether or not the old column family version is marked as shown at 503. An unmarked old column family version indicates that the data in the old column family version has not yet been migrated to the new column family version. A marked old column family version indicates that the data in the old family version has already been migrated to the new column family version.

If it is determined that old column family version is not marked (i.e., data has not yet migrated from the old column family version to the new family column version), then a notification of an unsuccessful update is returned to the requesting controller VM as shown at 509. A notification of an unsuccessful update is returned in this situation because data from the old column family version has not yet migrated to the new column family version, and attempting to perform any modification to the column family while it is in this state would lead to subsequent data inconsistencies. After the notification of unsuccessful update is returned to the controller VM, the controller VM can subsequently re-attempt to modify the column family. The controller VMs request to update the column family will be fulfilled when the old column family version is marked (i.e., data has migrated from the old column family version to the new column family version), which will be described in additional detail below.

So long as the old column family version is not marked (i.e., data has not migrated from the old column family version to the new column family version), any attempt to modify the column family will result in a notification of unsuccessful update being returned. It is only after the old column family version has been marked and it is ensured that data has migrated from the old column family version to the new column family version that an attempt on the column family will be successfully fulfilled. This ensures consistency of data and data accesses while the NoSQL database is in a migrating state.

In order to ensure that a subsequent attempt to modify the column family by the controller VM will succeed, the controller VM is forced to perform a lookup request when it receives a notification of an unsuccessful update. The lookup request will be fulfilled in the manner described above in FIG. 3. In responding to the lookup request, data may be read from the old column family version, and an attempt to update the new column family version with data read from the old column family version will be made. If the attempt to update the new column family version with data read from the old column family version is successful, then a subsequent attempt to perform an update of the column family by the controller VM will be successfully performed on the new column family version. If the attempt to update the new column family version in response to the lookup request by the controller VM is unsuccessful, then a concurrent lookup request by another controller VM will result in data being read from the old column family version to the new column family version, and a subsequent attempt to perform an update of the column family by the controller VM will be successfully performed on the new column family version.

Alternatively, if it is determined that old column family version is marked (i.e., data has already migrated from the old column family version to the new family column version), then the modification is made to the new column family as shown at 505. Because the old column family version is marked, data from the old column family version has migrated to the new column family version, and a subsequent update to the new column family version will allow for subsequent data accesses to maintain consistency.

Once the update to the column family is fulfilled by modifying the new column family version, a notification of successful update may be returned to the requesting controller VM as shown at 507.

Handling modifications during a rolling upgrade of a column family in a NoSQL database in the above-described manner (e.g., using compare and swap), avoids the need for implementing a locking mechanism and thereby significantly reduces the downtime associated with lock-based upgrades.

Figure 6:
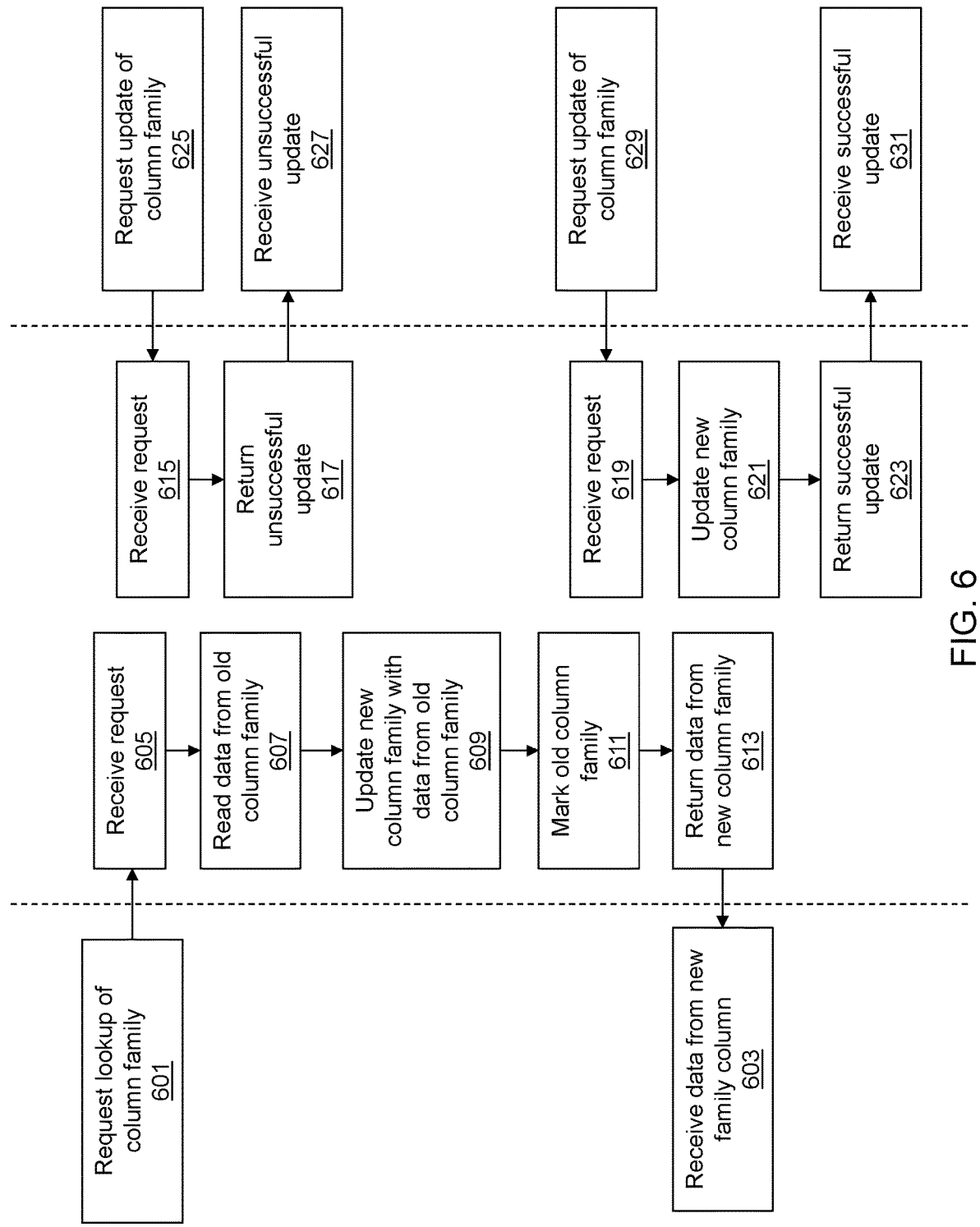
FIG. 6 illustrates an example of the mechanism for performing lockless modifications during a rolling upgrade of a column family in a NoSQL database according to some embodiments of the invention.

FIG. 6 illustrates an example of the mechanism for performing lockless modifications during a rolling upgrade of a column family in a NoSQL database according to some embodiments of the invention. FIG. 6 will be used to illustrate the example where a second controller VM issues a modification request directed at a column family substantially concurrent with a first controller VM issuing a lookup request directed at the column family while the column family is in a migrating state.

In FIG. 6, steps performed by the first controller VM are depicted in the column to the left of the dashed line on the left hand side, steps performed at the NoSQL database are depicted in the column between the two dashed lines and steps performed by the second controller VM are depicted in the column to the right of the dashed line on the right hand side. For purposes of example, it will be assumed that the lookup request issued by the first controller VM will reach the NoSQL database ahead of the modification request issued by the second controller VM, even though the first and second controller VMs issue their requests substantially concurrently. Time is depicted as moving in the downward direction.

The first controller VM issues a lookup request directed at the NoSQL database as shown at 601 and the NoSQL database receives the lookup request as shown at 605. Here, the lookup request issued by the first controller VM is the first lookup request issued while the column family is in a migrating state. Because the lookup request is the first lookup request issued while the column family is in a migrating state, data from the old column family version has not yet migrated to the new column family version.

When the request to perform the lookup of the column family issued by the first controller VM is received, a determination is made as to whether or not data is available in the new column family version. Here, it is determined that data is unavailable in the new column family version. This is because the lookup request issued by the first controller VM is the first lookup request, and data has not yet migrated from the old column family version to the new column family version because no earlier lookup request has been issued to initiate the migration.

Because it is determined that data is unavailable in the new column family version, data from the old column family version is first read as shown at 607 and an attempt to update the new column family version with data read from the old column family version is made. The attempt to update the new column family version with data from the old column family version succeeds, and the new column family version is updated with data from the old column family version as shown at 609. This indicates that the lookup request issued by the first controller VM is the first lookup request issued on the column family.

After the new column family version has been updated with data from the old column family version, the old column family version is marked as shown at 611. Data from the new column family version may then be returned to the first controller VM as shown at 613 where it is received as shown at 603.

The second controller VM concurrently issues a modification request directed at the NoSQL database as shown at 625 and the NoSQL database receives the lookup request as shown at 615. Here, the modification request issued by the second controller VM is substantially concurrent with the first lookup request issued by the first controller VM.

When the request to modify the column family issued by the second controller VM is received, a determination is made as to whether or not the old column family is marked (i.e., data from the old column family version has migrated to the new column family version). Because the modification request issued by the second controller VM is substantially concurrent with the first lookup request issued, the old column family is not yet marked because data has not yet migrated from the old column family version to the new column family version. This is because fulfillment of the first lookup request not yet being completed.

Because it is determined that the old column family version has not been marked (i.e., data has not been migrated from the old column family version to the new column family version), the request to modify the column family cannot be fulfilled and a notification of unsuccessful update is returned as shown at 617 where it is then received by the second controller VM as shown at 627.

After the second controller VM has received a notification of unsuccessful update, it may subsequently issue another modification request of the column family as shown 629. The subsequent modification request is received by the NoSQL database as shown at 619. At this point in time, the old column family has been marked (i.e., data from the old column family version has already migrated to the new column family version) and so the NoSQL database is able to fulfill the modification request by updating the new column family version as shown at 621. A notification of successful update is then returned as shown at 623 and is received by the requesting second controller VM 631.

Thus, FIG. 6 illustrates an example of handling modification requests directed at a NoSQL database in a migrating state that avoids the need for implementing a locking mechanism and thereby significantly reduces the downtime associated with upgrading the NoSQL database.

System Architecture

Figure 7:
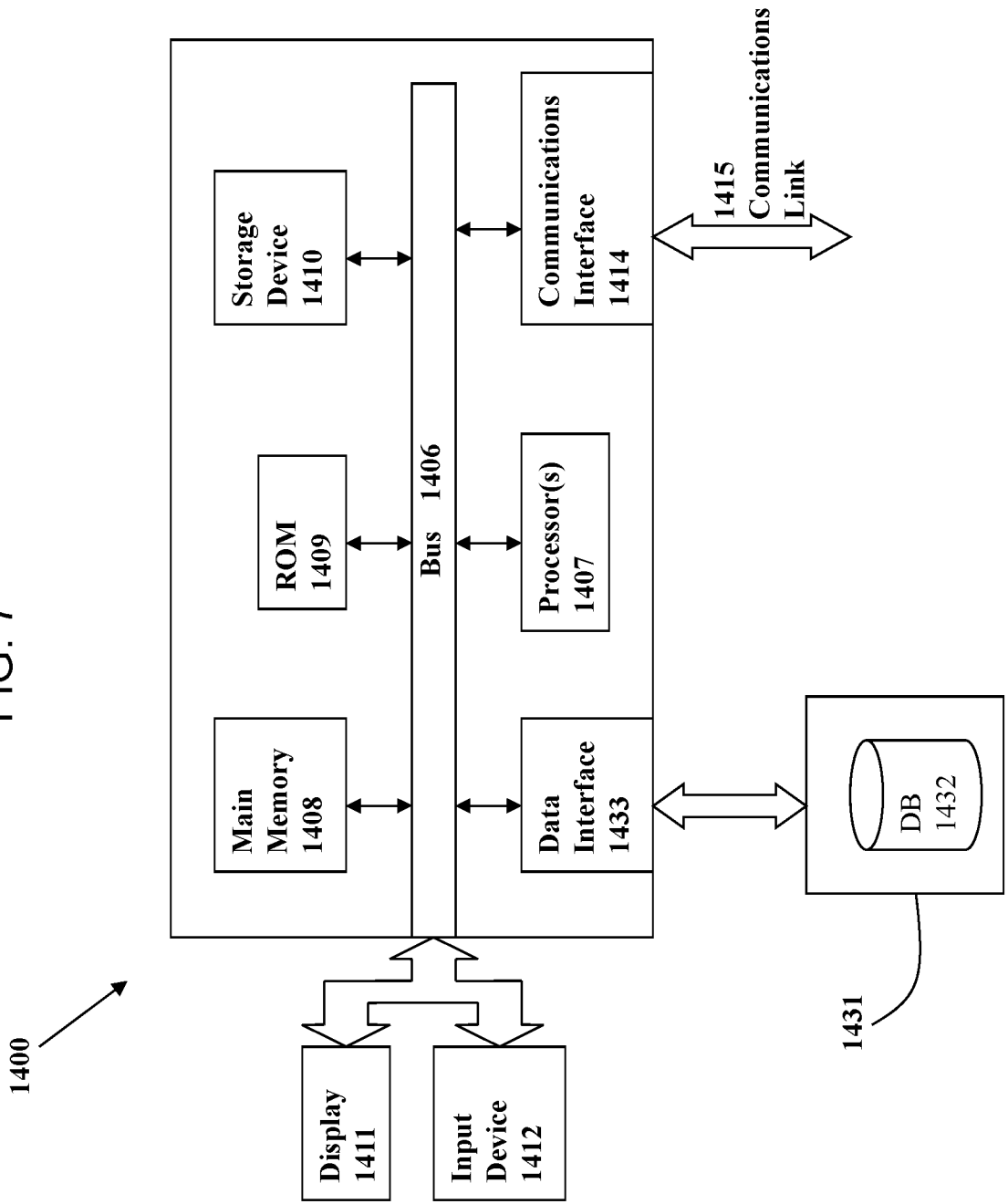
FIG. 7 is a block diagram of an illustrative computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:
receiving a request to perform a lockless modification of a column family in a NoSQL database during a rolling upgrade of the column family from an old column family version to a new column family version, wherein the NoSQL database is shared by a controller virtual machine, wherein the controller virtual machine resides at a node in a networked virtualization environment and provides storage management functionality to a user virtual machine residing at the node, and wherein the NoSQL database is utilized to maintain metadata used by the controller virtual machine to provide storage management functionality to the user virtual machine;
determining whether the old column family version is marked, wherein a marked old column family version indicates that data from the old column family version has been migrated to the new column family version;
returning a notification of an unsuccessful modification when the old column family version is not marked; and
fulfilling the request to perform the modification of the column family by modifying the new column family version when the old column family version is marked.

2. The method of claim 1, wherein a controller VM issuing the request to perform the modification of the column family in the NoSQL database performs a lookup request on the column family upon receiving the notification of the unsuccessful modification.

3. The method of claim 2, wherein a subsequent attempt by the controller VM to perform an update of the column family will be successfully performed on the new column family version.

4. The method of claim 1, wherein the column family is in a migrating state, the migrating state indicating that the rolling upgrade of the column family has begun but not yet completed.

5. The method of claim 1, further comprising returning a notification of a successful update after fulfilling the request to perform the modification of the column family by modifying the new column family version.

6. The method of claim 1, wherein an unmarked old column family version indicates that the data in the old column family version has not yet migrated to the new column family version when the column family is in a migrating state.

7. The method of claim 1, wherein a marked old column family version indicates data in the old column family version has migrated to the new column family version when the column family is in a migrating state.

8. A computer program product embodied on a non-transitory computer readable medium, the non-transitory computer readable medium having stored thereon a sequence of instructions which, when executed by a processor causes the processor to execute a method, the method comprising:
receiving a request to perform a lockless modification of a column family in a NoSQL database during a rolling upgrade of the column family from an old column family version to a new column family version, wherein the NoSQL database is shared by a controller virtual machine, wherein the controller virtual machine resides at a node in a networked virtualization environment and provides storage management functionality to a user virtual machine residing at the node, and wherein the NoSQL database is utilized to maintain metadata used by the controller virtual machine to provide storage management functionality to the user virtual machine;
determining whether the old column family version is marked, wherein a marked old column family version indicates that data from the old column family version has been migrated to the new column family version;
returning a notification of an unsuccessful modification when the old column family version is not marked; and
fulfilling the request to perform the modification of the column family by modifying the new column family version when the old column family version is marked.

9. The computer program product of claim 8, wherein a controller VM issuing the request to perform the modification of the column family in the NoSQL database performs a lookup request on the column family upon receiving the notification of the unsuccessful modification.

10. The computer program product of claim 9, wherein a subsequent attempt by the controller VM to perform an update of the column family will be successfully performed on the new column family version.

11. The computer program product of claim 8, wherein the column family is in a migrating state, the migrating state indicating that the rolling upgrade of the column family has begun but not yet completed.

12. The computer program product of claim 8, further comprising returning a notification of a successful update after fulfilling the request to perform the modification of the column family by modifying the new column family version.

13. The computer program product of claim 8, wherein an unmarked old column family version indicates that the data in the old column family version has not yet migrated to the new column family version when the column family is in a migrating state.

14. The computer program product of claim 8, wherein a marked old column family version indicates data in the old column family version has migrated to the new column family version when the column family is in a migrating state.

15. A system comprising:
a processor; and
a memory comprising computer code executed using the processor, in which the computer code implements:
receiving a request to perform a lockless modification of a column family in a NoSQL database during a rolling upgrade of the column family from an old column family version to a new column family version, wherein the NoSQL database is shared by a controller virtual machine, wherein the controller virtual machine resides at a node in a networked virtualization environment and provides storage management functionality to a user virtual machine residing at the node, and wherein the NoSQL database is utilized to maintain metadata used by the controller virtual machine to provide storage management functionality to the user virtual machine,
determining whether the old column family version is marked, wherein a marked old column family version indicates that data from the old column family version has been migrated to the new column family version,
returning a notification of an unsuccessful modification when the old column family version is not marked, and
fulfilling the request to perform the modification of the column family by modifying the new column family version when the old column family version is marked.

16. The system of claim 15, wherein a controller VM issuing the request to perform the modification of the column family in the NoSQL database performs a lookup request on the column family upon receiving the notification of the unsuccessful modification.

17. The system of claim 16, wherein a subsequent attempt by the controller VM to perform an update of the column family will be successfully performed on the new column family version.

18. The system of claim 15, wherein the column family is in a migrating state, the migrating state indicating that the rolling upgrade of the column family has begun but not yet completed.

19. The system of claim 15, in which the computer code further implements returning a notification of a successful update after fulfilling the request to perform the modification of the column family by modifying the new column family version.

20. The system of claim 15, wherein an unmarked old column family version indicates that the data in the old column family version has not yet migrated to the new column family version when the column family is in a migrating state.

21. The system of claim 15, wherein a marked old column family version indicates data in the old column family version has migrated to the new column family version when the column family is in a migrating state.

22. A method comprising:
receiving a request to perform a lockless modification of a column family in a NoSQL database during a rolling upgrade of the column family from an old column family version to a new column family version, wherein the NoSQL database is shared by a controller virtual machine, wherein the controller virtual machine resides at a node in a networked virtualization environment and provides storage management functionality to a user virtual machine residing at the node, and wherein the NoSQL database is utilized to maintain metadata used by the controller virtual machine to provide storage management functionality to the user virtual machine; and
performing the lockless modification of the column family by:
determining if data has been migrated from the old column family version to the new column family version,
upon determination that the data has not been migrated, returning a notification of an unsuccessful modification, and
upon determination that the data has been migrated, modifying the new column family version with the lockless modification.

23. The method of claim 22, wherein an unmarked old column family version indicates that the data in the old column family version has not yet migrated to the new column family version when the column family is in a migrating state.

24. The method of claim 22, wherein the column family is in a migrating state, the migrating state indicating that the rolling upgrade of the column family has begun but not yet completed.

25. A computer program product embodied on a non-transitory computer readable medium, the non-transitory computer readable medium having stored thereon a sequence of instructions which, when executed by a processor causes the processor to execute a method, the method comprising:
receiving a request to perform a lockless modification of a column family in a NoSQL database during a rolling upgrade of the column family from an old column family version to a new column family version, wherein the NoSQL database is shared by a controller virtual machine, wherein the controller virtual machine resides at a node in a networked virtualization environment and provides storage management functionality to a user virtual machine residing at the node, and wherein the NoSQL database is utilized to maintain metadata used by the controller virtual machine to provide storage management functionality to the user virtual machine; and
performing the lockless modification of the column family by:
determining if data has been migrated from the old column family version to the new column family version, upon determination that the data has not been migrated, returning a notification of an unsuccessful modification, and upon determination that the data has been migrated, modifying the new column family version with the lockless modification.

26. The computer program product of claim 25, wherein an unmarked old column family version indicates that the data in the old column family version has not yet migrated to the new column family version when the column family is in a migrating state.

27. The computer program product of claim 25, wherein the column family is in a migrating state, the migrating state indicating that the rolling upgrade of the column family has begun but not yet completed.

* * * * *